United States Patent [19]
Hsu et al.

[11] Patent Number: 5,854,934
[45] Date of Patent: Dec. 29, 1998

[54] OPTIMIZING COMPILER HAVING DATA CACHE PREFETCH SPREADING

[75] Inventors: Wei Hsu, Cupertino; Loren Staley, Cool, both of Calif.

[73] Assignee: Hewlett-Packard Company, Palo Alto, Calif.

[21] Appl. No.: 702,359

[22] Filed: Aug. 23, 1996

[51] Int. Cl.⁶ .............................. G06F 9/45; G06F 12/08
[52] U.S. Cl. ...................... 395/709; 395/705; 395/383; 395/584; 395/588; 711/118; 711/137; 711/213; 711/217; 711/171
[58] Field of Search ..................... 395/709, 705, 395/383, 381, 584, 583, 588; 711/118, 137, 171, 217, 213, 218

[56] References Cited

U.S. PATENT DOCUMENTS

| | | | |
|---|---|---|---|
| 5,752,037 | 5/1998 | Gornish et al. | 395/709 |
| 5,761,468 | 6/1998 | Emberson | 395/383 |
| 5,761,718 | 6/1998 | Lin et al. | 711/137 |

OTHER PUBLICATIONS

Chi et al., "Compiler driven data cache prefetching for high performance computers," Proceedings of TENCON'94—IEEE Region 10's 9th Annual Int'l Conf. on: 'Frontiers of Computer Technology', Singapore, Aug. 1994.

Patterson, David A. and Hennessy, John L., Computer Architecture A Quantitative Approach, second edition, Morgan Kaufmann Publishers, Inc., San Francisco, California, 1996 (first edition 1990), pp. 139–177; 289–305.

Blainey, R. J., "Instruction Scheduling in the TOBEY compiler," IBM J. Res. Develop, vol. 38, No. 5, Sep. 1994, pp. 577–593.

Farkas, Keith I. and Jouppi, Norman P., Complexity/Performance Tradeoffs with Non-Blocking Loads, IEEE, 1994, pp. 211–222.

Mowry, Todd; Lam, Monica and Gupta,Anoop, "Design and Evaluation of a Compiler Algorithm for Prefetching," Proceedings of the Fifth International Conference on Architectural Support for Programming Languages and Operating Systems, Oct. 1992.

*Primary Examiner*—James P. Trammell
*Assistant Examiner*—Tuan Q. Dam

[57] ABSTRACT

A method of scheduling prefetch instructions in a compiler is described that improves performance by minimizing the performance degradation due to dirty cache misses. The method determines the length N of a loop (step 66). The number of prefetch instructions were M within that loop are then determined (step 68). A prefetch spacing P is then calculated according to the formula P=N/M, where the length of the loop is expressed in cycles (step 70). This prefetch spacing is then attached to each prefetch instruction and the instruction scheduler schedules the prefetch instructions so as to space the prefetch instructions apart by approximately the prefetch spacing P (step 72). After the scheduler arranged for P cycles, a prefetch instruction will be assigned a higher priority for scheduling in the next lot.

19 Claims, 2 Drawing Sheets

OPTIMIZING COMPILER HAVING DATA CACHE PREFETCH SPREADING

BACKGROUND OF THE INVENTION

This application contains same subject matter in common with U.S. Ser. No. 08/704,218, filed on the same date herewith, entitled "ARRAY PADDING FOR HIGHER MEMORY THROUGHPUT IN THE PRESENCE OF DIRTY MISSES" by Wei Hsu.

This invention relates generally to operating systems and more particularly to optimizing compilers.

Compilers are a well known software that convert source code written in a high level language such as C or C++ to object code that can be executed by a target microprocessor. Thus, the compiler translates high level instructions written by the software developer to a format that can be read and understood by the microprocessor.

Modern compilers do more than just convert source code to object code. Another main function of the compiler is to optimize the individual instructions in order to increase the performance of the executable code. This optimization is performed in several discrete steps as shown in FIG. 1. Optimization begins with certain high level optimizations done at a procedural level. These high level optimizations include so-called procedure inlining, loop transformations and global restructuring and analysis. This step is done at a high level.

The remaining optimizations form the "back end" of the optimizer. First, back end optimizations are done at the basic block level and are thus referred to as, BBopt. A basic block, as is known in the art of compiler design, is a block of code that has a single entry and a single exit. Data and control flows are identified in the next step, called Intervals. It is in this step that loop nests are identified. Common subexpressions (CSE) are then identified. Common subexpressions are those expressions that are executed more than once so that the result of the first expression can be reused in subsequent instances and that expression does not have to be recomputed each time.

In Step 20, a life span of each variable is defined using two chains: a use define (UD) chain and a define use (DU) chain. These chains are used to allocate registers since variables with nonoverlapping life spans can be allocated to the same register. Memory webs are then formed in Step 22. Each web is a grouping of the definition in use for a given variable. Each web can then be assigned to a separate register.

The next step 24 performs several loop-related optimizations. The first are so-called loop invariant code motion (LICM) optimizations. These optimizations move invariant computations outside of a control loop so that they do not have to be repeated inside the loop. The next optimization is a technique known as loop unrolling. In loop unrolling, the body of the loop is replicated multiple times within the loop and the loop terminating code is adjusted accordingly. This does two things. First, it reduces the loop overhead because now the loop termination code is executed only once every N iterations of the original loop, where N is equal to the number of times the loop body is unrolled. Second, loop unrolling improves instruction scheduling by giving the compiler more instructions to reorder so as to increase the instruction level parallelism (ILP). Instruction scheduling is discussed further below.

Also during Step 24, prefetch instructions are generated. Prefetching is a technique used to hide the latency of a cache miss by making a memory reference far in advance of when that data is required. Prefetching is most often done in loops because it is easier to predict that a data element will be required in the future. How far in advance the microprocessor must fetch or "prefetch" is determined by four variables: The stride distance (S); the latency (L) between main memory and the cache; the loop iteration time (T); and, the cache line size (N). In fact, the so-called prefetch distance (P) can be computed based on these four variables according to the following formula:

$$P = S(L/T)/N \text{ (rounded to nearest integer)}$$

where L and T are measured in cycles, N is expressed in terms of the number of data elements in the cache line, and P is expressed in units of cache line size. This relationship intuitively makes sense since, as the latency increases, the compiler will have to fetch farther in advance to allow sufficient time for the element to be brought from main memory to the cache. The prefetch distance, on the other hand, has the opposite relationship to the loop iteration time. The longer the loop iteration time, the more time the data has to move from main memory to the cache. Thus, the prefetch distance is inversely proportional to the loop iteration time (T). The prefetch distance is also a function of the cache line size because for each reference the cache will automatically fetch the entire line from main memory. Therefore, single prefetches are required for every (N) data elements. Accordingly, the expression for the prefetch distance is divided by N.

One simple way to accomplish prefetching in software is for the compiler to insert a load instruction, which moves the data elements into a register. Then, when the data element is actually required, it will be in a register and then can be operated on by the microprocessor. Subsequent prefetches can then move data elements into other registers. The problem with this approach is that the compiler quickly runs out of available registers.

Another approach is to attempt to load each prefetched data element into a predetermined register. Thus, only a single register is consumed. In those architectures where one register is "hard wired" to zero, the load can be made to this register so that the instruction is ineffectual, i.e. the data is not actually written into the register. However, it is stored in the cache. More advanced microprocessors recognize this instruction as a prefetch operation and do not attempt to write the data into the register itself. This technique works well for most loops.

The next step 26 in the optimization process forms register webs which, like memory webs, are a technique used to group elements to a particular register. The next optimization procedure is instruction scheduling in Step 28. Instruction scheduling is a technique of recording instructions so as to avoid or minimize the impact of situations that prevent subsequent instructions in the instructions stream from executing during its designated clock cycle in a pipelined microprocessor. These situations are called hazards and take three different forms. The first are structural hazards that arise from resource conflicts when the hardware cannot support all possible combinations of instructions in simultaneous overlapped execution. Data hazards, on the other hand, arise when an instruction depends on the result of a previous instruction in a way that is exposed by the overlapping of instructions in the pipeline. Finally, control hazards arise from the pipelining of branches and other instructions that change the program counter (PC). Hazards in the pipeline can stall the pipeline, thereby increasing the number of clock cycles per instruction (CPI). The scheduling optimizer 28 rearranges or reorganizes the instructions so as to eliminate some or all of these hazards while at the same time maintaining program correctness. Each of these hazards is dealt with by the compiler in a different yet similar way.

Pipelining is a technique used in advanced microprocessors to increase the instruction throughput of the machine. Pipelining, in essence, divides an instruction up into discrete stages such that each stage can typically be executed in only a single clock cycle. A typical pipeline might consist of five stages: An instruction fetch (IF) stage, an instruction decode (ID), an execute (EX), a memory (MEM), and a writeback (WB) stage. An instruction proceeds through each of these stages in a sequential manner with a new instruction being inserted into the pipeline or "issued" every cycle. Subsequent instructions can continue to be issued unless a hazard arises which causes one instruction to stall. Accordingly, at any one point in time, there are multiple instructions in various stages of execution in the pipeline.

When a machine is pipelined, the overlapped execution of instructions requires pipelining of functional units and duplication of resources to allow all possible combinations of instructions in the pipeline. If some combination of instructions cannot be accommodated because of resource conflicts, the machine is said to have a structural hazard. The most common instances of structural hazards arise when some function unit is not fully pipelined. Then, a sequence of instructions using that unpipelined unit cannot proceed at the rate of one clock cycle. Another common way that structural hazards appear is when some resource has not been duplicated enough to allow all combinations of instructions in the pipeline to execute. For example, a machine may have only a single register-file write port, but under certain circumstances, the pipeline might want to perform two writes in a single clock cycle. This will generate a structural hazard. When a sequence of instructions encounters this hazard, the pipeline will stall at one of the instructions until the required unit is available. The optimizer attempts to avoid these structural hazards by spacing out the instructions that require a common resource by at least the latency of the resource so that the prior instruction will be complete, and the resource thus available, before the subsequent instruction accesses that resource. Individual instructions are inserted between these two instructions so that the machine can perform useful work between them.

A major effect of pipelining is to change the relative timing of instructions by overlapping their execution. This introduces data and control hazards. Data hazards occur when the pipeline changes the order of read/write accesses to operands so that the order differs from the order seen by sequentially executing instructions on an unpipelined machine. The most common example of a data hazard is where the operand abort instruction is dependent on the result of the prior instruction. Often these hazards can be dealt with in hardware by a technique known as "forwarding" whereby the result of one instruction is immediately made available to a subsequent instruction, even before the result has been written to the destination register. There are some instruction combinations, however, that this technique cannot address.

The classic example is a load instruction followed by an instruction that uses the results of the load. Forwarding cannot be used in this case because the result is required by the subsequent instruction before the data is physically present in the pipeline. Instead, a hardware mechanism called a pipeline interlock is required to preserve the correct execution pattern. In general, a pipeline interlock detects a hazard and stalls the pipeline until the hazard is cleared. In this case, the interlock stalls the pipeline, beginning with the instruction that wants to use the data until the source instruction produces it. In most modern microprocessors, this combination of instructions produces a one-cycle or more "bubble" in the pipeline. The compiler, on the other hand, can easily address this problem by inserting one or more instructions between the load and the instruction that requires the result of the load so that the data is available when the subsequent instruction requires it. This eliminates the pipeline bubble and therefore increases machine performance.

Control hazards can cause an even greater performance loss than data hazards. Control hazards typically arise due to branches because the control flow suddenly changes from the next sequential instruction to a distant instruction either forward or backward of the current program counter address. Branches often produce a so-called "branch delay slot" that is much like the load delay slot produced by the load data hazard. This branch delay slot is one or more cycles following a branch instruction, during which time the branch condition is evaluated and the branch target determined. The compiler can fill these branch delay slots with useful instructions. In this way, the pipeline bubble can be avoided and the performance increased.

All of the instruction scheduling performance in step 28 is done prior to register allocation, i.e. pre-alloc. By scheduling the instructions before the registers have been allocated, the compiler has much greater freedom to reorder the instructions. In fact, the compiler may have too much freedom, which requires the instructions to be rescheduled following the register allocation, as described further below.

The registers are allocated in step 30 using a conventional graph coloring technique. The complex control flow in software requires the graph coloring technique to identify potential interferences between variables. If the graph indicates that there are no interferences between two variables, they can be assigned to the same register. Peephole optimizations are then performed in step 32. These optimizations are instruction set specific. For example, two or more simple instruction can be replaced by more complex instruction or vice versa, thereby reducing the number of cycles. Branch optimizations are then conducted in step 34. Examples include replacing two successive branches with a single longer branch that spans the two branches. Finally, the resulting instructions are scheduled in step 36 to eliminate or reduce the bubbles produced by the post-allocation optimizations.

Advances in microprocessor architecture have also helped increase the amount of achievable instruction level parallelism. An example of such developments is shown in FIG. 2, in which a block diagram of the Hewlett-Packard PA-8000 architecture is shown. The PA-8000 is the first implementation of the PA-Risc 2.0 architecture. This processor implements out-of-order execution, allowing the hardware to reorder operations at run time. This hardware feature is widely believed to subsume some functionality of the instruction scheduler in the compiler. The PA-8000 is an out-of-order superscalar processor. The processor can issue up to four operations per clock cycle and aggressively reschedules operations to maximize the use of its functioning units.

The PA-8000 is designed around a 56 entry instruction reorder buffer (IRB) 38. The IRB 38 is divided into two independent queues: one for arithmetic and logical units (ALU) operations and one for memory operations. Instructions in the IRB 38 can be executed out of order, increasing the available instruction level parallelism in the instruction stream. Instructions are fetched from an off-chip instruction cache 40 by an instruction fetch unit 42. The instructions are fed to a sort block 44 that sorts the instructions so as to align the ALU instructions with the 28-lot ALU queue and the memory instructions with the 28-lot memory queue. Up to four instructions per clock cycle can be inserted to the IRB 38, assuming there is the proper mix of ALU instructions and memory instructions. Once the instructions are inserted into the IRB, they are launched to their respective functional units based on the availability of their inputs. Two operations from each queue may be launched every cycle. The selection of these operations is based on their insertion order in their respective queues. Operations which are inserted into an odd buffer slot are launched on the odd functional unit, and even polarity operations are launched on the even units. The PA-8000 includes fives pairs of functional units: two 64-bit integer ALUs 46, two shift/merge units 48, two multiply/accumulate units 50, two divide/square root units 52, and two load/store address units 54. There is an odd and even functional unit in each pair.

Arbitration logic in the IRB selects the oldest ready instruction on each polarity of launch during the current cycle. Since this arbitration is performed based on source ordering, the instruction scheduler should present the critical operations early in the instruction stream. Thus, by bringing these operations higher in the buffer, the instruction scheduler helps the PA-8000 processor launch critical operations soon after their inputs become available.

The instructions in the IRB 38 are removed by a retire block 56. The retire block 56 commits the results of operations to an externally visible state machine comprised of memory and architectural registers 58. Every cycle, the retire unit 56 can retire up to two operations from each of the queues, two from the ALU queue and two from the memory queue. Only one store can be retired per cycle. Although the retirement bundle has flexible boundaries, instructions must be retired in program order. This constraint produces a definite limit on the PA-8000 execution band width that is dependent on the instruction schedule. If an instruction takes more than 14 clock cycles to complete, then a pipeline stall will happen.

Integer ALU operations execute in a single cycle, enabling the launch of dependent operations one cycle later. Floating point operations typically take three cycles to execute on the dual float multiply and accumulate (FMAC) units 50. The FMAC units 50 are pipelined and can start a new operation every cycle. Memory accesses are also handled by the dual pipelines units 54. A load that hits in the cache will usually complete execution three cycles after the initial launch. Although these operations have latencies, the IRB can hide this from the retire unit by starting operations before they reach the top of the reorder buffers. This behavior allows an instruction scheduler the option of not honoring the latency between dependent operations without forcing a hardware stall. The IRB, however, cannot schedule around all latencies and hence the pipeline does, in fact, stall.

Accordingly, the need remains for an instruction scheduler that can schedule around long latency hazards.

SUMMARY OF THE INVENTION

It is, therefore, an object of the invention to provide an improved instruction scheduling technique that avoids long latency hazards.

We have discovered that a major source of long latency hazards are prefetch instructions, particularly in systems that have non-blocking caches. Non-blocking caches allow the processor to continue executing instructions while the data cache miss is resolved. Cache misses are very expensive, especially for a wide superscalar architecture such as the PA-8000, SGI R10000, DEC EV5 21164 and others. When a memory operation that missed in the data cache reaches the top of the queue, it cannot retire until the data comes back from memory. Due to the long memory latency, the queue may fill up, stalling the instruction fetch unit. For loops with regular memory access patterns, the user can request the insertion of cache prefetch instructions (loads to general purpose register 0). Unlike regular memory operations, these instructions can retire from the queue without waiting for data to come back when they miss. With data cache prefetching, the optimization process can make the cache miss happen several iterations ahead (a prefetch instruction will fetch data to be used a few iterations later) effectively hiding memory latency.

Prefetch instructions are scheduled like regular memory instructions. We have discovered, however, that since prefetch instructions do not have consumers, they are usually scheduled last in a critical path driven scheduler. As a result, prefetches tend to be clustered at the end of a loop body. This approach works fine if most of the misses are clean. Dirty misses, on the other hand, cause performance problems. A dirty miss is a miss in a cache in which one or more elements in the corresponding victim cache line have been changed so that the contents of the cache line must be written back to main memory. This write-back makes the data path of the cache/memory interface busy for a few cycles. We have discovered that a cluster of prefetches at the end of a body loop can produce a burst of dirty misses that blocks the launch of further cache misses. This behavior is difficult to model in a deterministic way since the compiler does not know which memory operation may cause a dirty miss. We have invented a scheduling technique to deal with this situation that significantly improves the performance of already scheduled code.

Based on our analysis of scheduled code, our technique spreads prefetches evenly over the loop body. We have developed a formula for determining the distance for separation between adjacent prefetches. The formula uses two parameters: the number of cycles N per iteration of a loop and the number of prefetches M within that iteration. Each prefetch is then scheduled N÷M cycles apart. The performance impact of prefetch spreading using this technique produced performance increases of three to nine percent on several Spec 95 programs, which is a significant performance increase over already scheduled code.

The foregoing objects, features and advantages of the invention will become more readily apparent from the following detailed description of a preferred embodiment which proceeds in accordance with the accompanying drawings.

DETAILED DESCRIPTION

Figure 3:
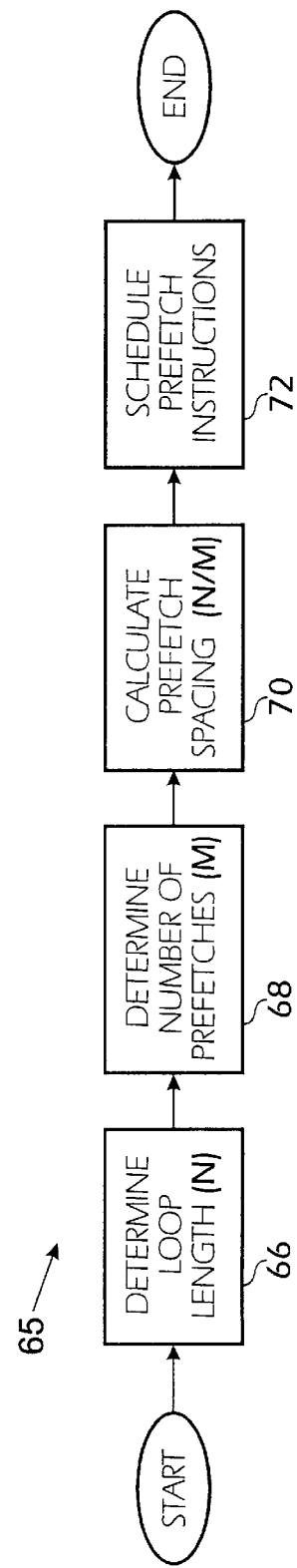
FIG. 3 is a flow chart of the prefetch scheduling technique according to the invention.
Figure 2:
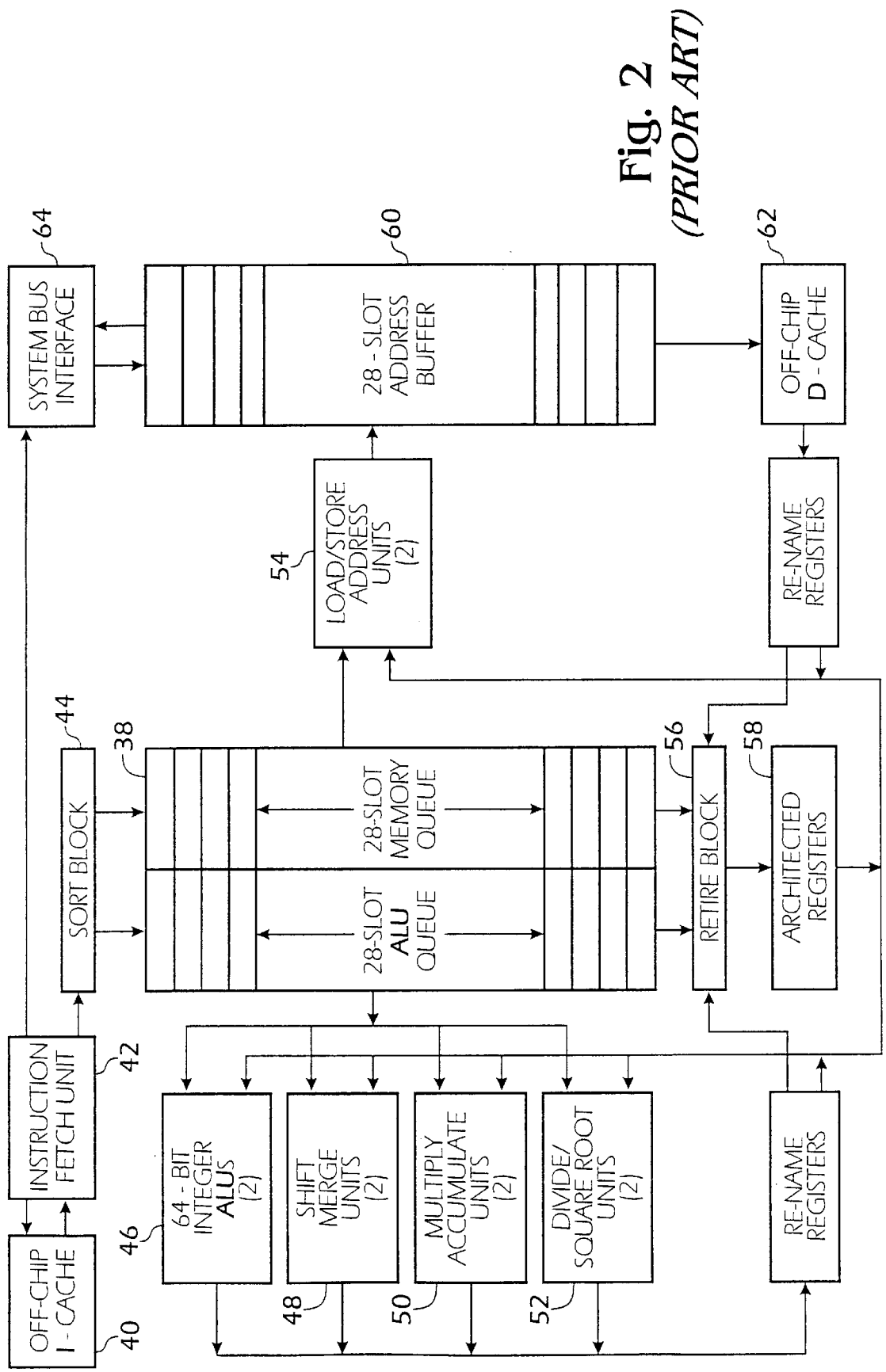
FIG. 2 is a block diagram of a prior art implementation of the Hewlett-Packard PA-8000 architecture.

Referring now to FIG. 3, a method of scheduling prefetch instructions according to invention is shown generally at 65.

Figure 1:
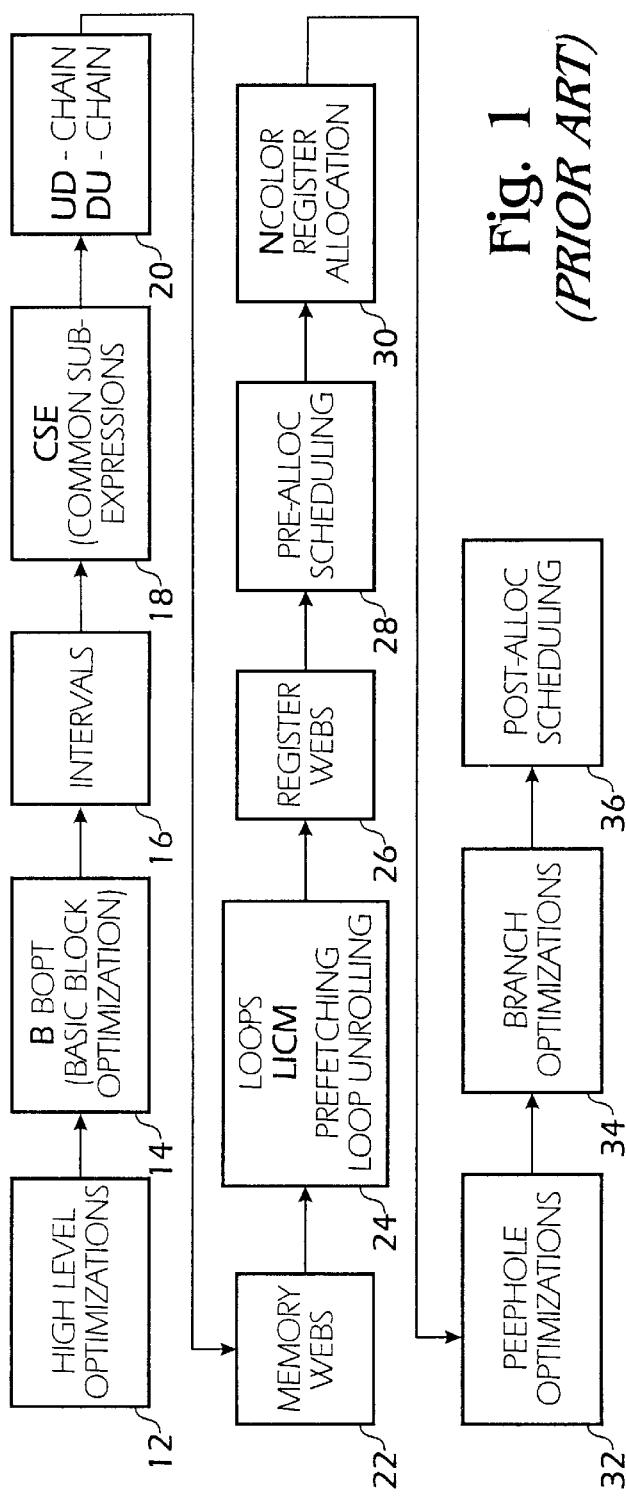
FIG. 1 is a flow chart of a prior art optimizer.

These steps are preferably executed during the pre-allocation code scheduling phase (step 28 in FIG. 1), but can also be performed during the post-allocation scheduling (step 36 in FIG. 1).

The scheduling scheme according to the invention was developed based on several observations made by analyzing already optimized scheduling code. The first observation is that, in a data prefetch loop, cache misses usually occur on prefetch instructions. The second observation is that prefetch instruction have no correctness issues, i.e. they may be arranged in any place in the loop body block without affecting correctness. The third observation is that the optimizer has no information about which of the prefetch instructions is likely to miss. It is for this reason that cache misses due to prefetch instructions cannot be treated in the same way as other structural hazards which are deterministic. The latency of prefetch instructions is not deterministic because some can hit in the cache while others can miss. Moreover, there is no way to tell which of those misses will be dirty.

The method 65 includes three basic steps. The first step 66 is to determine the length of a given loop. The length is measured in clock cycles and is estimated according to the resource utilization and latency constraints of the system. This length is assigned to the variable N. Next, in step 68, the number of prefetch instructions within the loop is determined. These prefetch instructions could either be generated during this step or more likely, as in the preferred embodiment, the prefetch instructions are generated prior to this scheduling step during the loop based optimizations (step 24 in FIG. 1). The number of prefetches is assigned to the variable M. Prior art methods of generating a prefetch instruction, such as that described above, can be used. Another method of generating prefetch instructions is described in my commonly-assigned, copending application entitled "METHOD OF PREFETCHING DATA FOR REFERENCES WITH MULTIPLE STRIDE DIRECTIONS," Ser. No. 08/639,134, filed Apr. 26, 1996, now U.S. Pat. No. 5,752,037, incorporated herein by reference. This latter method is preferably used where the data reference has multiple strides, i.e., arguments that are functions of diverging loop indices.

The next step 70 is calculating the prefetch spacing P according to the following formula:

$$P = N/M$$

where N is equal to the loop length in cycles and M is the number of prefetches within the loop. The prefetch instructions are then scheduled in step 72 using conventional scheduling techniques so that each prefetch instruction is spaced apart from a subsequent prefetch instruction by the calculated prefetch spacing P. The scheduler can then treat the prefetch spacing P in the same way that it schedules around the fixed latency structural hazards. The scheduler may not be able to space each prefetch instruction by exactly P cycles from an adjacent prefetch instruction, but the instruction scheduler attempts to do so. Preferably, the instruction scheduler can schedule adjacent prefetch instructions within +/−1 cycle of the prefetch spacing P. The scheduler accomplishes this by assigning the prefetch instruction a high priority once the previous prefetch instruction is separated by P cycles.

An example of optimize code before and after the prefetch scheduling according to the invention is shown below in Table 1.

TABLE 1

Loop before and after prefetch scheduling.

| BEFORE | AFTER |
|---|---|
| FLDD-24(% r23), % fr31 | FLDD-24(% r23), % fr31 |
| FLDD-24(% r24), % fr25 | FLDD-24(% r24), % fr25 |
| FMPY % fr31, % fr10, % fr11 | LDW 192(% r23), % r0 |
| FADD % fr25, % fr11, % fr12 | FMPY % fr31, % fr10, % fr11 |
| FLDD-16(% r23), % fr30 | FADD % fr25, % fr11, % fr12 |
| FLDD-16(% r24), % fr28 | FLDD-16(% r23), % fr30 |
| FMPY % fr30, % fr10, % fr13 | FLDD-16(% r24),% fr28 |
| FADD % fr28, % fr11, % fr14 | FMPY % fr30, % fr10, % fr13 |
| FSTD % fr12, -24(% r25) | FADD % fr28, % fr13, % fr14 |
| LDW 192(% r23), % r0 | LDW 192(% r24), % r0 |
| FSTD % fr14, -16(% r25) | FSTD % fr12, -24(% r25) |
| LDW 192(% r24), % r0 | LDO 24(% r23), % r23 |
| LDO 24(% r23), % r23 | FSTD % fr14, -16(% 25) |
| LDW 192(% r25), % r0 | LDO 25(% r24), % r24 |
| LDO 24(% r25), % r25 | LDW 192(%25), % r0 |

The instruction in the left hand column of Table 1 is a listing of instructions from the loop body of a typical loop. As can be seen therein, the control instructions for the loop are not included in the loop body. In the preferred embodiment, the loop length does not include the number of cycles consumed by the loop control instruction (e.g. branches); however, the length can so include these instruction and the invention includes such. As can be seen by the left hand column, the prefetch instruction (i.e., LDW 192 (%rX), %r 0)) are clustered toward the bottom of the loop body. In contrast, after prefetch scheduling, the prefetch instructions are spaced approximately the same distance apart (in cycles) using the prefetch scheduling method described above. The prefetch instructions are not exactly equally spaced apart but only approximately so because of the other scheduling constraints such as data dependencies within the loop.

The above-described prefetch scheduling method has produced significant performance improvements in already scheduled code for several benchmark programs. A listing of several commonly used benchmark programs that form a part of the Spec 95 test suite and the resulting speed up achieved by the prefetch scheduling method according to the invention is shown in Table 2.

TABLE 2

Test Program and Achieved Speed Up Using Prefetch Scheduling Technique

| Program | Speed Up |
|---|---|
| 101.Tomcatv | 1.03 |
| 102.swim | 1.04 |
| 103.su2cor | 1.00 |
| 104.hydro2d | 1.01 |
| 107.mgrid | 1.02 |
| 110.aplu | 1.09 |
| 146.wave5 | 1.03 |

Having described and illustrated the principles of the invention in a preferred embodiment thereof, it should be apparent that the invention can be modified in arrangement and detail without departing from such principles. We claim all modifications and variation coming within the spirit and scope of the following claims.

We claim:

1. A method of scheduling instructions for execution on a computer system including a data cache or data cache hierarchy, the method comprising the steps of:

determining a length of a loop;

generating a plurality (M) of prefetch instructions; and scheduling the plurality of prefetch instructions to space out the prefetch instructions throughout the length of the loop.

2. The method of scheduling instructions for execution on a computer system according to claim 1 wherein the step of spacing out the prefetch instructions throughout the length of the loop includes spacing out the prefetch instructions within the loop so that there is approximately the same distance between each prefetch instruction so as to minimize performance degradation due to dirty misses in the cache caused by the prefetch instructions.

3. The method of scheduling instructions for execution on a computer system according to claim 2 wherein the step of determining a length of a loop includes determining a number of cycles (N) required by the loop.

4. The method of scheduling instructions for execution on a computer system according to claim 3 wherein the step of determining a number of cycles (N) required by the loop includes:

determining resource constraints within the system; and determining latency constraints within the system.

5. The method of scheduling instructions for execution on a computer system according to claim 4 wherein the step of determining a number of cycles (N) required by the loop includes:

determining a number of cycles required by each instruction in the loop; and adding the number of cycles required by each instruction together to determine the number of cycles required by the loop.

6. The method of scheduling instructions for execution on a computer system according to claim 3 wherein the step of spacing out the prefetch instructions within the loop so that there is approximately the same distance between each prefetch instruction includes spacing a prefetch instruction approximately N/M cycles from a prior prefetch instruction.

7. The method of scheduling instructions for execution on a computer system according to claim 3 wherein the step of spacing out the prefetch instructions within the loop so that there is approximately the same distance between each prefetch instruction includes spacing a prefetch instruction approximately N/M cycles from a subsequent prefetch instruction.

8. The method of scheduling instructions for execution on a computer system according to claim 3 wherein the step of spacing out the prefetch instructions within the loop so that there is approximately the same distance between each prefetch instruction includes spacing each prefetch instruction apart from a subsequent prefetch instruction by a respective number of cycles, wherein the total spacing between a first prefetch instruction and a last prefetch instruction is equal to the number of cycles (N) required by the loop.

9. The method of scheduling instructions for execution on a computer system according to claim 2 wherein the step of spacing out the prefetch instructions within the loop so that there is approximately the same distance between each prefetch instruction includes spacing each prefetch instruction approximately N/M cycles from a prior prefetch instruction.

10. An optimizing compiler stored in a computer-readable memory device and executable by a computer system having a data cache or data cache hierarchy, the compiler comprising:

means for identifying a loop;

means for determining a length of the loop;

means for generating a plurality (M) of prefetch instructions; and means for spacing out the prefetch instructions throughout the length of the loop.

11. The optimizing compiler according to claim 10 wherein the means for spacing out the prefetch instructions throughout the length of the loop includes means for spacing out the prefetch instructions within the loop so that there is approximately the same distance between each prefetch instruction.

12. The optimizing compiler according to claim 11 wherein the means for determining a length of the loop includes means for determining a number of cycles (N) required by the loop.

13. The optimizing compiler according to claim 12 wherein the means for determining a number of cycles (N) required by the loop includes:

means for determining resource constraints within the system; and means for determining latency constraints within the system.

14. The optimizing compiler according to claim 11 wherein the means for spacing out the prefetch instructions within the loop so that there is approximately the same distance between each prefetch instruction includes:

means for determining a number of cycles (N) required by the loop;

means for dividing the number of cycles (N) by the number of prefetch instructions to produce a prefetch spacing (S); and means for spacing out the prefetch instructions by approximately the prefetch spacing (S).

15. The optimizing compiler according to claim 14 wherein the means for spacing out the prefetch instructions by approximately prefetch spacing (S) includes means for rounding the prefetch spacing to an integer number of cycles.

16. The optimizing compiler according to claim 15 wherein the means for spacing out the prefetch instructions by approximately prefetch spacing (S) includes means for rounding the prefetch spacing up to an integer number of cycles.

17. The optimizing compiler according to claim 15 wherein the means for spacing out the prefetch instructions by approximately prefetch spacing (S) includes means for rounding the prefetch spacing down to an integer number of cycles.

18. The optimizing compiler according to claim 11 wherein the means for spacing out the prefetch instructions within the loop so that there is approximately the same distance between each prefetch instruction includes:

means for determining a number of cycles (N) required by the loop; and means for spacing each prefetch instruction apart from a subsequent prefetch instruction by a respective number of cycles, wherein the total spacing between a first prefetch instruction and a last prefetch instruction is equal to the number of cycles (N) required by the loop.

19. The optimizing compiler according to claim 18 wherein the means for spacing each prefetch instruction apart from a subsequent prefetch instruction by a respective number of cycles, wherein the total spacing between a first prefetch instruction and a last prefetch instruction is equal to the number of cycles (N) required by the loop includes means for spacing each prefetch instruction apart from a subsequent prefetch instruction by an equal number of cycles.

* * * * *